S. A. GRAY.
AUXILIARY AUTOMOBILE SEAT.
APPLICATION FILED AUG. 29, 1921.
1,407,408.
Patented Feb. 21, 1922.
Fig. 1.
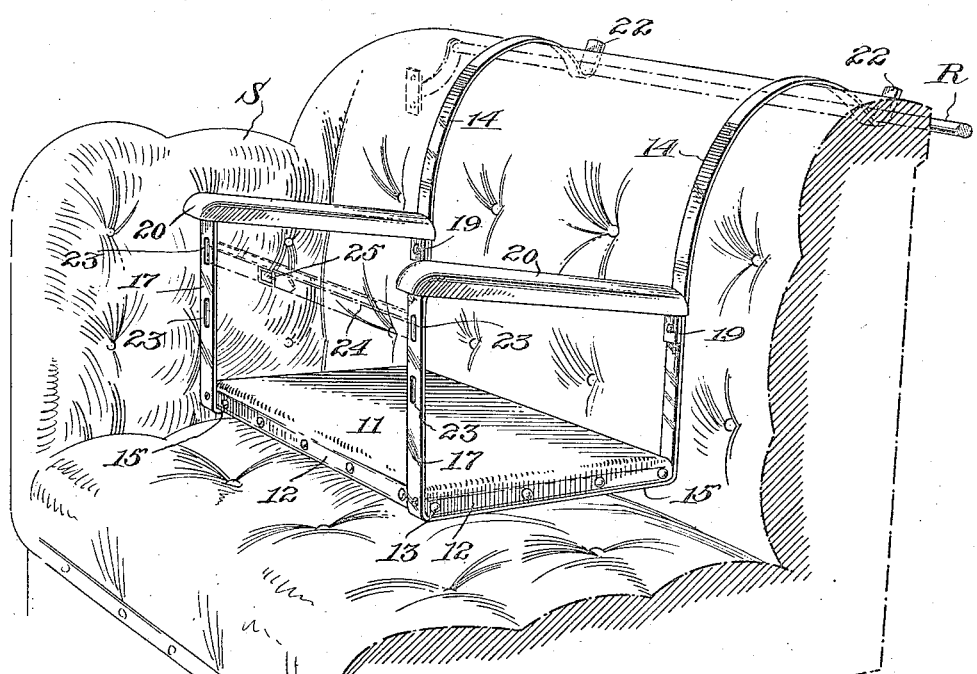
Fig. 2.
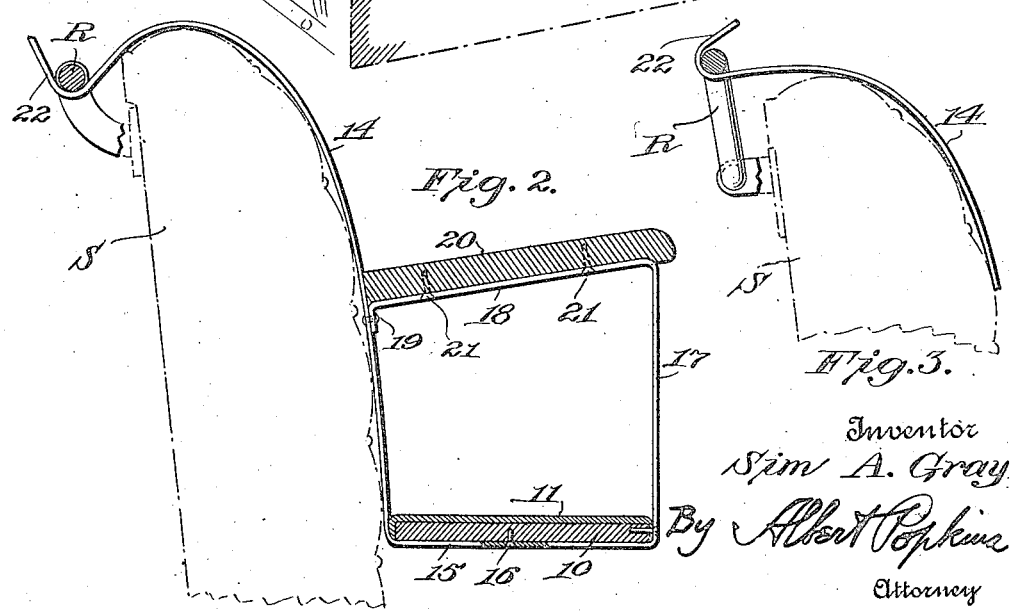
Fig. 3.
Inventor
Sim A. Gray
By Albert Popkins
Attorney

UNITED STATES PATENT OFFICE.

SIM ALLEN GRAY, OF CHATTANOOGA, TENNESSEE.

AUXILIARY AUTOMOBILE SEAT.

1,407,408.  Specification of Letters Patent.  Patented Feb. 21, 1922.

Application filed August 29, 1921. Serial No. 496,239.

*To all whom it may concern:*

Be it known that I, SIM A. GRAY, a citizen of the United States, residing at Chattanooga, in the county of Hamilton and State of Tennessee, have invented certain new and useful Improvements in Auxiliary Automobile Seats, of which the following is a specification.

This invention relates to automobile attachments and has special reference to an auxiliary automobile seat.

It is well known that the driver of an automobile finds it very difficult to transport a small child in the seat beside him because of the danger to the child itself and because of the danger of accident to the machine caused by distraction of the operator's attention from his driving made necessary by the need of watching the child.

One important object of the present invention is to provide a simple and efficient seat which may be hung over the back of the front seat of an automobile and which will securely hold a small child without danger to the child and without requiring the operator to take his attention from his driving.

It is also well known that the usual front seat of an automobile is very uncomfortable for a small child because it is too long for the child to sit up with its feet hanging down over front and yet at the same time find proper support for its back. It is also uncomfortable because most automobile seats are so high that even with the child sitting at the front of the seat its feet do not reach the floor.

A second important object of the invention is to provide an improved and novel detachable seat which will be thoroughly comfortable for the child occupying it.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a perspective view showing the invention as applied to the front seat of the automobile.

Figure 2 is a side elevation partly in section of the device in position on an automobile having one form of robe rail.

Figure 3 is a view showing a slight modification for use in connection with an automobile having a different form of robe rail.

In the embodiment of the invention herein illustrated two forms have been shown, one of these forms being suitable for a car having a fixed robe rail while the other form is more suitable for a car having a swinging robe rail.

In the illustrations of each of these forms the front seat of the automobile is indicated at S and the robe rail at R. The invention itself comprises a seat portion having a body 10 of wood or other suitable material and this body is preferably covered with leather or other like material 11, the same being held around the edges of the body by securing straps 12 and screws or tacks 13. This seat is supported in a substantially horizontal position above the bottom of the seat S and in front of the seat back. To accomplish the support in this manner there is provided a pair of supporting members 14 which are curved to conform to the front face and top of the automobile seat S. These supporting members are preferably formed of strap iron and that their lower ends are extended forward as at 15 beneath the lateral edge portions of the seat 10, being secured thereto by screws 16 or any other suitable means. At the forward ends of the portions 15 the strap iron is bent upwardly as at 17 and then rearwardly and downwardly as at 18 so that an angled end of each of the irons lies against the respective body portion and is secured in such position by a rivet 19. On the portions 18 of the strap irons are mounted arms 20 which are held in position by screws 21 or other suitable means. At the extremities of the rearwardly bent parts of the members 14 hooks 22 are provided which may be engaged on the robe rail R by inverting the seat, the seat after such engagement being rocked forwardly and downwardly into the position shown in the figures. Thus the seat will be securely held so that a child may occupy the same and its feet may rest on the seat bottom of the automobile seat S, its back resting against the back of said automobile seat.

In order to prevent the child's falling out forwardly the support portions 17 are provided with slots 23 where through may be passed a strap 24 having a suitable buckle 25. By this means a child may be carried comfortably and safely on the front seat of an automobile while at the same time the driver is free to devote his entire attention to driving.

There has thus been provided a simple and efficient device of the kind described and for the purposes specified.

It is obvious that minor changes may be made in the form and construction of the invention without departing from the material principles thereof. It is not therefore desired to confine the invention to the exact form herein shown and described, but it is wished to include all such as properly come within the scope claimed.

Having thus described the invention, what is claimed as new, is:—

An auxiliary automobile seat comprising a seat portion, rigid supporting members carrying the seat portion extending upward from the back of the seat portion and having rearwardly bent upper ends to conform to and extend over the back of an automobile seat, and hooks on the extremities of the rearwardly bent portions adapted to engage an automobile robe rail, said hooks being bent in a direction reversely to the bend on the upper seat back engaging portion.

In testimony whereof I affix my signature.

SIM ALLEN GRAY.